(12) United States Patent
Tichenor et al.

(10) Patent No.: US 6,698,692 B1
(45) Date of Patent: Mar. 2, 2004

(54) AIRCRAFT FUEL TANK ULLAGE SAFETY SYSTEM

(76) Inventors: Clyde L. Tichenor, P.O. Box 734, Somis, CA (US) 93066; Irwin Ginsburgh, 30402 Terracina Pl., Castaic, CA (US) 91384

( * ) Notice: Subject to any disclaimer, the term of this patent is extended or adjusted under 35 U.S.C. 154(b) by 0 days.

(21) Appl. No.: 10/336,543

(22) Filed: Jan. 3, 2003

Related U.S. Application Data

(60) Provisional application No. 60/345,596, filed on Jan. 4, 2002.

(51) Int. Cl.$^7$ .............................................. B64D 37/00
(52) U.S. Cl. ................ 244/135 R; 55/385.3; 261/DIG. 2; 96/155
(58) Field of Search ................ 244/135 R, 135 B, 244/135 A; 55/385.3, 385.4; 261/DIG. 2; 96/155, 156

(56) References Cited

U.S. PATENT DOCUMENTS

| | | | | |
|---|---|---|---|---|
| 2,860,648 A | * | 11/1958 | Harrison | 137/38 |
| 3,691,730 A | * | 9/1972 | Hickey et al. | 96/161 |
| 3,788,039 A | * | 1/1974 | Bragg | 96/174 |
| 5,845,879 A | * | 12/1998 | Jensen | 244/135 R |
| 6,547,188 B2 | * | 4/2003 | Schmutz et al. | 244/135 R |
| 6,585,192 B2 | * | 7/2003 | Beers | 244/135 R |

* cited by examiner

*Primary Examiner*—J. Woodrow Eldred

(57) ABSTRACT

An aircraft fuel tank ullage safety system (10) that is designed to maintain the fuel tank ullage (94) of an aircraft fuel tank (90) filled with nitrogen. The nitrogen prevents the fuel tank ullage (94) from becoming filled with flammable fuel fumes which can cause an explosion. The system (10) consists of at least one flexible, resilient, air-enclosing container (12) having a container ullage (50) that is dimensioned to substantially occupy the space of the fuel tank ullage (94), a differential pressure sensor (30) that determines the internal pressure of the aircraft's fuel tank (90) and a microcontroller (64) that controls and maintains the volume of the air-enclosing container (12) as determined by the differential pressure sensor (30).

21 Claims, 4 Drawing Sheets

AIRCRAFT FUEL TANK ULLAGE SAFETY SYSTEM

CROSS-REFERENCE TO RELATED APPLICATION

This application claims priority of Provisional Patent Application Ser. No. 60/345,596 filed Jan. 4, 2002.

TECHNICAL FIELD

The invention general pertains to aircraft safety devices, and more particularly, to a system that prevents the build-up of flammable gas within an aircraft's fuel tank ullage.

BACKGROUND ART

In recent years, the issue of jet fuel safety has gained significant momentum. Especially in the wake of the mid-air explosion of TWA 800 out of New York, which FAA experts recently concluded was due to flammable vapors which were emitted from unexpectedly heated Jet-fuel in the 747's center fuel tank. The vapors were able to mix with a sufficient amount of oxygen in the fuel tank's ullage (space above the fuel) to create a flammable mixture that was ignited by an unknown source. Consequently, the FAA has formed several Aviation Research Advisory Committee (ARAC) sub-committees comprised of experts in the fields of aircraft manufacturing, airport systems and fuel delivery/management to determine the best solutions for minimizing combustible conditions in jet fuel tanks.

The oxygen contained in ambient air is readily soluble in contemporary grades of commercial and military jet fuels. Absorbed oxygen and other volatile substances in such fuels have a tendency to degas from the fuels during the reduced atmospheric pressures of an aircraft's ascent and cruise phases of flight. The degaussing oxygen increases existing oxygen levels in the aircraft's fuel tank ullage, which can create a danger by broadening the flammable vapor range. For example, if a Boeing 737 center wing tank (CWT) having a capacity of 4000 gallons is filled with 3000 gallons of Jet-A fuel at sea level, the fuel can have as much as 15% ambient air absorbed therein with roughly 21% of the air being oxygen. As the aircraft ascends to a cruise altitude, the decreased atmospheric pressure in the CWT causes absorbed air to degas from the fuel (as predicted in Henry's Law). At the decreased pressures, the degaussed 15% air will typically expand 300–400% (depending on altitude), which results in a significant addition of oxygen into the ullage of the CWT. When the oxygen level of the air in the ullage exceeds 8%, the fuel tank is considered to be on the threshold of a combustible condition. The petroleum's volatile evaporated gas simply adds to this undesirable explosive condition.

Recent ARAC consultations have suggested that replacing ambient air, and the oxygen it contains, from jet fuel before it is pumped aboard aircraft would be desirable, if such a step can be achieved in a manner that is economically viable and would not increase refueling time. With the type of jet fuel delivery systems employed to date, it has not been practical to provide or deliver a very low-air content safety-enhanced jet fuel to aircraft refueling locations such as airports, airport fuel farms, airport terminals, air bases, aircraft-carriers, and the like. Nor has it been practical to maintain the very low-air content safety-enhanced feature of such fuels with those systems. The absence of such systems and the safety-enhanced jet fuels they would provide has lead to the consideration of supplying nitrogen gas to the fuel tank ullage in place of the air and oxygen. Covering the fuel surface and preventing fuel evaporation can enhance this improvement. A further improvement is to minimize mixing between nitrogen and incoming vent air. The concept further calls for isolating the incoming vent air and requiring that the fuel surface be covered as much as possible with a float.

Nitrogen ($N_2$) production equipment must be provided in each aircraft to produce $N_2$ on demand, and to do so during peak fuel use periods. The floats that cover the fuel surface will minimize the need for $N_2$, but the wetting of the fuel tank walls will still create evaporative fuel conditions. This is greatest during maximum fuel use and is accumulative as the lowering fuel level creates a greater tank wall exposure. The present invention has features to minimize these conditions and maximize safer fuel tank ullage conditions.

A search of prior art patents and industry literature did not disclose any data that read directly on the claims of the instant invention.

DISCLOSURE OF THE INVENTION

Figure 1:
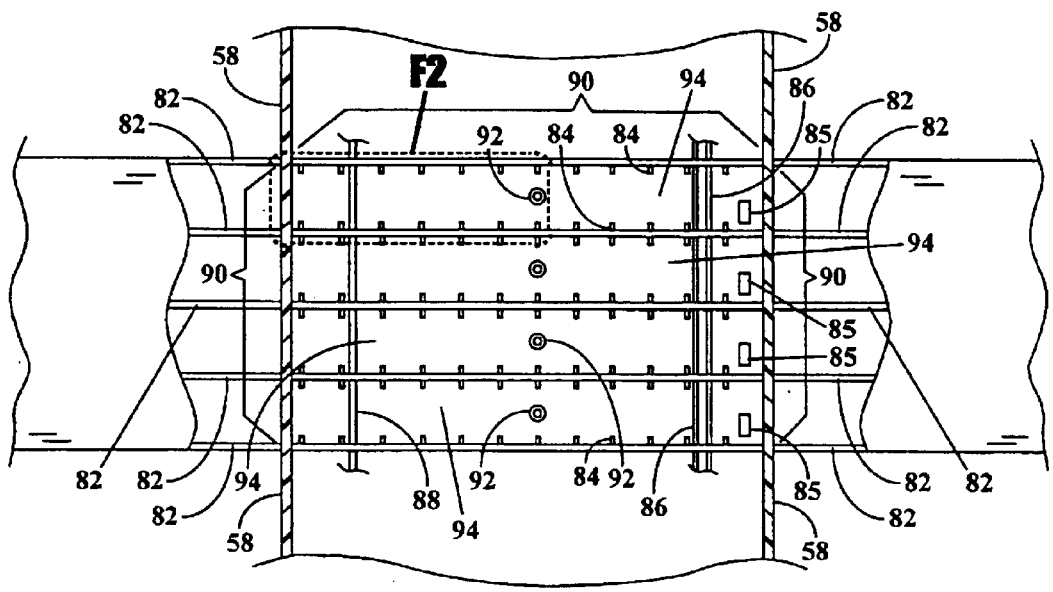
FIG. 1 is a top plan view of the wing and fuselage section of a commercial jet aircraft that contains a center wing fuel tank showing representatively major types of obstructions.

An aircraft fuel tank ullage safety system that is designed to function within an aircraft's fuel tank. The main elements of the safety system are at least one flexible, resilient air-enclosing container, a differential pressure sensor, a microcontroller and an inert gas source.

The air-enclosing container has a positive internal pressure for enclosing an air-filled aircraft fuel tank ullage and contacting maximum fuel surface area while containing air. The air-enclosing container is designed with means for allowing the container to be located within the fuel tank without being obstructed by the necessary structural and functional elements of the aircraft or the fuel tank.

As the fuel within the fuel tank is depleted, the fuel level decreases. The differential pressure sensor relays the changing pressure data to the microcontroller. The microcontroller than controls the input of the air to the air-enclosing container and an inert gas such as nitrogen, into the fuel tank ullage. As the air-enclosing container expands, the ullage above the fuel tank is occupied, thus not allowing any flammable gas to build-up. The air-enclosing container is located above the fuel surface in order to separate the original fuel tank ullage into two ullages, the fuel tank ullage and the air-enclosing container ullage.

In view of the above disclosure, the primary object of the invention is to provide an aircraft fuel tank ullage safety system that can effectively maintain an aircraft's fuel tank ullage substantially free from flammable gas.

It is also an object of the invention to provide an aircraft fuel tank ullage safety system that:

covers as much of the fuel surface as possible.

can introduce an inert gas immediately above the fuel surface and along the edges during all use conditions and at the lowest velocity possible, can provide a means which prevents air that is vented from mixing with the inert gas, and can create a minimum fuel tank ullage for the inert gas over the fuel and a maximum air-enclosing container ullage filled only with vented air.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment for an aircraft fuel tank ullage safety system 10 (hereinafter "AFTUSS 10") that is designed to function within an aircraft's fuselage or wing fuel tank. In order to fully describe the AFTUSS 10, reference will be made to the following elements of a conventional aircraft which are shown in FIGS. 1, 2 and 3, a fuselage 50, a plurality of wing spars 82, a plurality of spar stiffeners 84, a plurality of floor obstructions 85, a main fuel line 86, a plurality of electrical conduits 88, and a fuel tank 90, having a fuel level measuring tube 92 and a fuel tank ullage 94.

The function of the AFTUSS 10 is to provide a means by which the ullage above the fuel within the aircraft's fuel tank 90 can be occupied with an inert gas, which would significantly decrease the danger of an explosion occurring as a result of the increase of flammable gas within the ullage as the fuel level decreases. This is accomplished by creating two ullages, an air-enclosing container ullage 50 and a fuel tank ullage 94. The container ullage 50 is located within a air-enclosing container 12, which is filled with air. As the fuel level within the aircraft's fuel tank lowers, the ullage above the fuel becomes larger, thus allowing for a greater build-up of flammable gas. The air-enclosing container 12 is located above the fuel to minimize the fuel surface area. As the fuel level decreases, an inert gas, such as nitrogen is pumped into the fuel tank ullage 94 as the air-enclosing container 12 expands. As a result of these two occurrences, flammable gas that would normally be created from the fuel surface and the "wet" side walls of the fuel tank are displaced by the air-enclosing container 12 and the inert gas. The air-enclosing container 12 continues to expand as the fuel level decreases until the aircraft has landed, at which point the air-enclosing container 12 and the fuel tank are vented to allow the fuel tank to be re-filled with fuel.

As shown in FIGS. 1–8, the AFTUSS 10 is comprised of the following major elements: at least one air-enclosing containers 12, a manifold 54, a differential pressure sensor 64 and a microcontroller 66.

Figure 2:
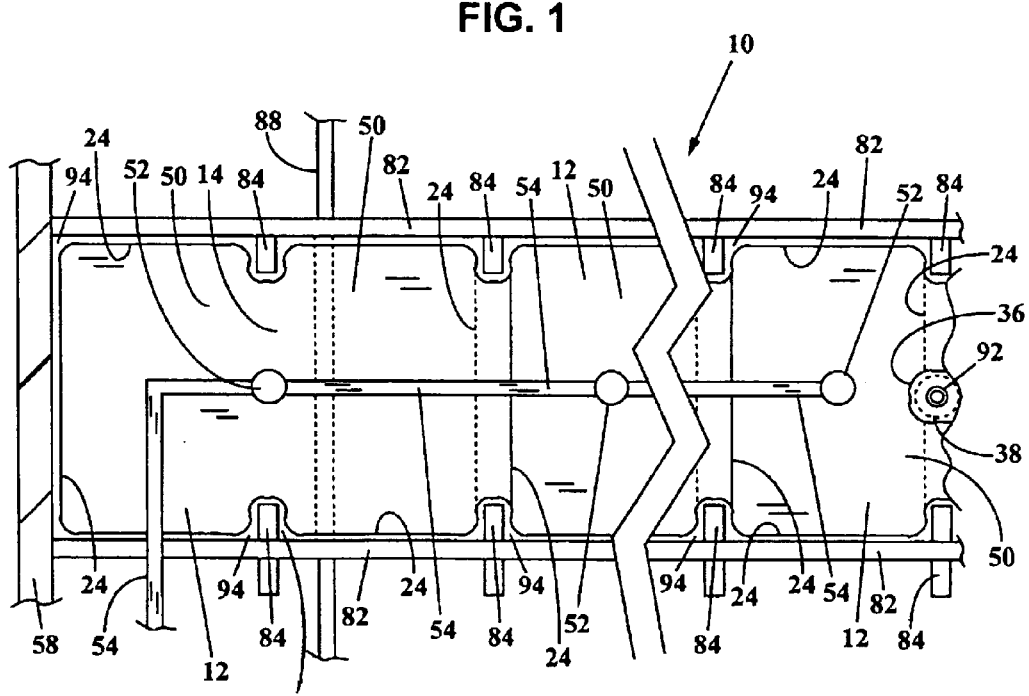
FIG. 2 is an enlarged view of a simplified top view of the wing and fuselage section as encircled and marked F2 in FIG. 1.
Figure 3:
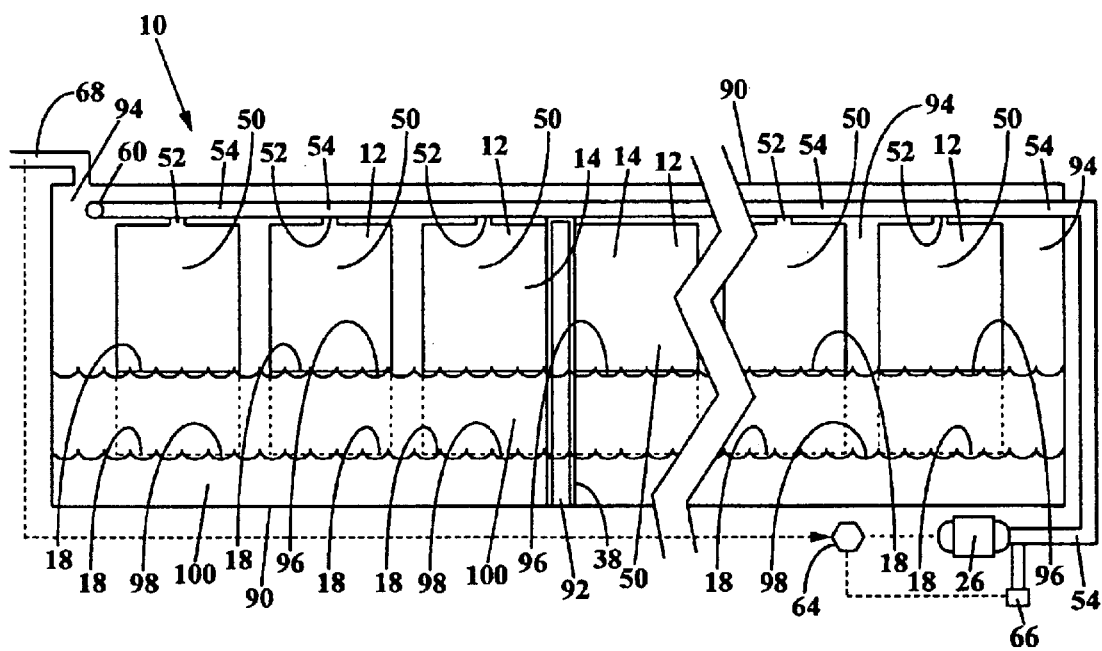
FIG. 3 is a simplified schematic plan view of a center wing fuel tank showing representative pneumatically-connected, air-enclosing containers and fuel surface relationships including a differential pressure sensor, a microcontroller, an air pump and an inert gas source.

The at least one air-enclosing container is shown as a single air-enclosing container 12 in FIG. 1, as a double air-enclosing container 14 in FIG. 2, and as a plurality of single and double air-enclosing containers in FIG. 3. For purposes of this disclosure, reference will only be made to the single air-enclosing container 12.

The air-enclosing container 12, which is filled with air, can be made of a fabric-reinforced plastic, nylon or the like, and is comprised of an upper surface 16, a lower surface 18, an inner surface 20, an outer surface 22 and side walls 24. The air-enclosing container 12 is also liquid fuel resistant, fuel vapor resistant, static-electricity resistant and fire resistant. As shown in FIG. 3, an air pump is utilized to provide air into the air-enclosing container 12. In order to relieve pressure within the air-enclosing container 12, a pressure relief valve 28 is utilized.

Figure 5:
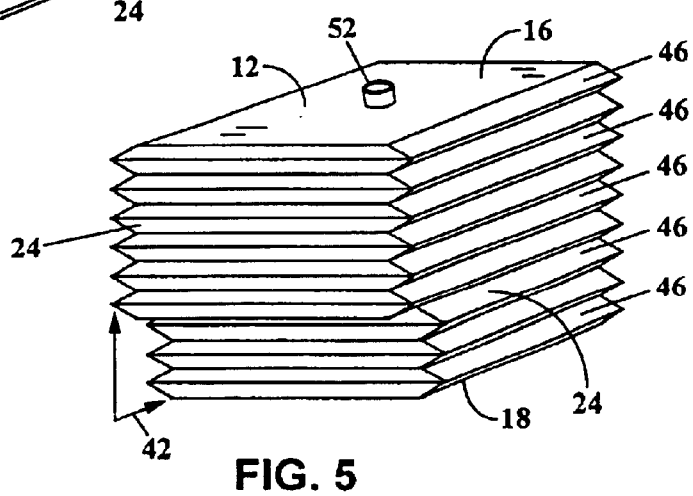
FIG. 5 is a perspective view of a air-enclosing container having a plurality of corrugated folds with the lower folds indented inward.
Figure 6:
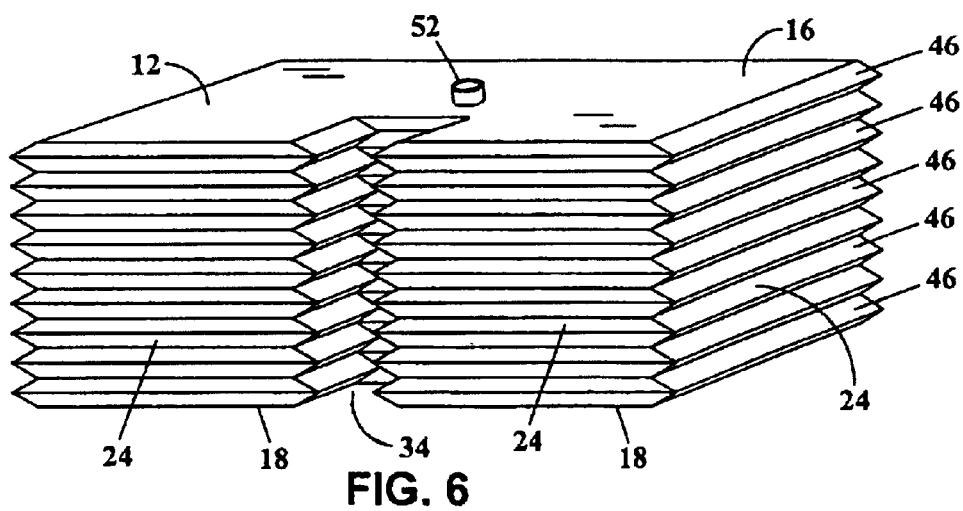
FIG. 6 is a perspective view of a air-enclosing container having on two sides a spar stiffener recess.

As shown in FIG. 6, a spar stiffener recess 34 is utilized to allow the air-enclosing container 12 to be located within the aircraft's fuel tank without obstruction from the aircraft's spar stiffeners 84. As also shown in FIG. 5 an offset 42 is utilized to also prevent obstruction from the aircraft's spar stiffeners 84, floor obstructions 85, wing spars 82 or electrical conduits 88.

Extending through the air-enclosing container's upper surface 16 to the lower surface 18 is a circular indentation 36, as shown in FIG. 3, which allows the aircraft's fuel level measuring tube 92 to pass therethrough. In order to insure that the air-enclosing container's surface does not accidentally come into contact with the fuel level measuring tube 92 when the tube 92 is within the circular indentation 36, a container clearance screen 38 is utilized, as shown in FIG. 3.

Figure 4:
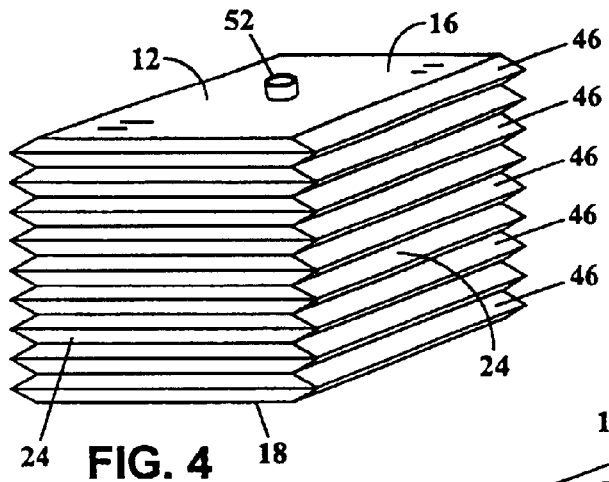
FIG. 4 is a perspective view of a air-enclosing container having a plurality of corrugated folds.
Figure 7:
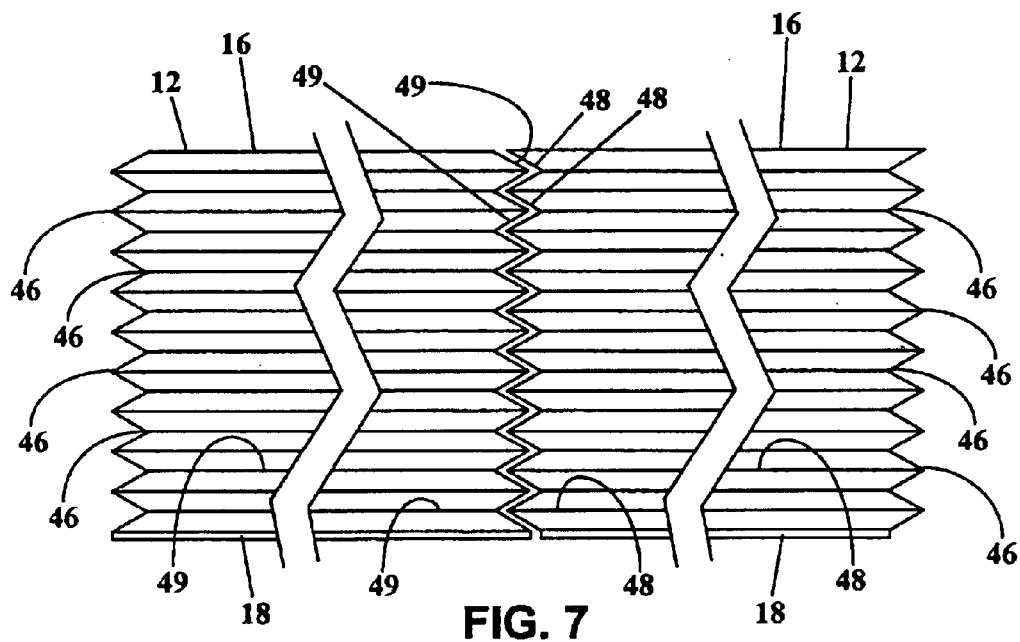
FIG. 7 is a side elevational view showing the interleaving of the corrugated folds of two adjacent air-enclosing containers.
Figure 8:
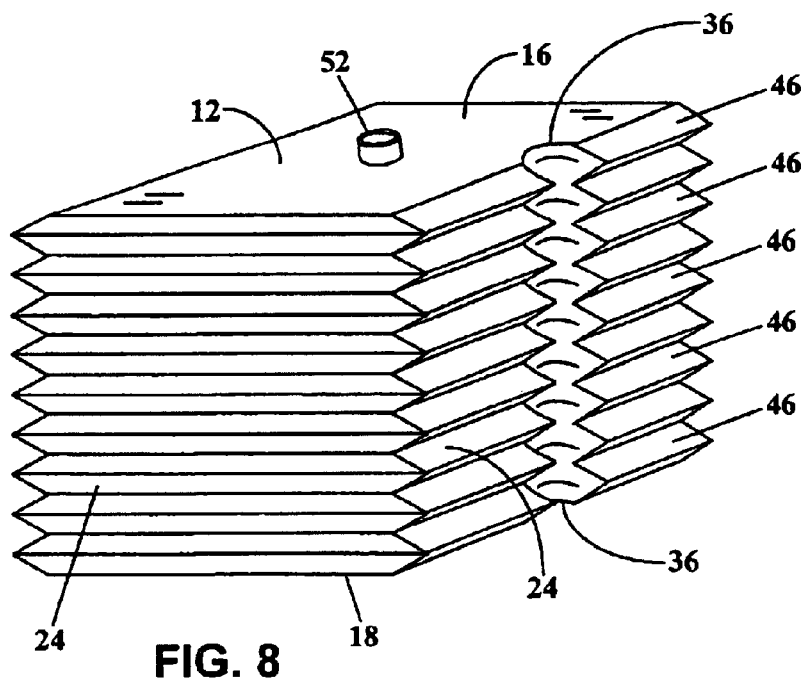
FIG. 8 is a perspective view of an air-enclosing container showing a circular indentation to provide clearance for any round vertical obstruction.

As shown in FIGS. 4, 5 and 6, a plurality of corrugated folds 46 are located along the air-enclosing container's 12 side walls 24. The corrugated folds 46 facilitate the opening (or expanding) and the closing (or contracting) of the air-enclosing container 12 as the level of gas within the container 12 increases or decreases, which varies as the fuel level increases or decreases. In FIG. 4, the air-enclosing container 12 has a plurality of corrugated folds 46, in FIG. 5, the lower corrugated folds are indented, and in FIG. 6, the plurality of corrugated folds 46 include a spar stiffener recess 34. As shown in FIG. 7, the corrugated folds that are located on adjacent air-enclosing containers 12 when two or more are utilized, have alternating positive corrugations 48 and negative corrugations 49. The alternating positive and negative corrugations 48,49 allow the adjacent air-enclosing containers 12 to interleave with each other in a secure manner. As shown in FIG. 8, the corrugated folds 46 can have the circular indentation 36 on one side, which allows the air-enclosing container 12 to be placed adjacent to each other while allowing the aircraft's fuel level measuring tube 92 to pass between the two containers 12.

Located within the air-enclosing container 12 is the container ullage 50, as shown in FIG. 1. In order to release the air from the container ullage 50, a manifold 54 is utilized. As also shown in FIG. 1, the manifold 54 is attached to the air-enclosing container 12 by a manifold connection means 52, which typically comprises a valve. The manifold 54 runs along the length of the aircraft's fuel tank 90 and terminates with an inner ullage vent 56. Also attached to the end of the manifold is the air pump 26 and the pressure relief valve 28, as shown in FIG. 1. In order to vent the fuel tank ullage 94, an outer ullage vent 58 is located above the fuel tank 90, as also shown in FIG. 1. As also shown in FIG. 1, when the upper fuel level 96 is at its highest position, the lower surface 18 of the air-enclosing container 12 rests upon the fuel's surface. As the fuel 100 is expended, the air-enclosing container 12 expands, and, as shown in dotted lines, the lower surface 18 of the container 12 continues to rest upon the fuel's surface until the fuel is at the lower fuel level 98.

Located within the aircraft's fuel tank 90 is also a differential pressure sensor 60, as shown in FIG. 1, which is utilized to determine the pressure within the fuel tank.

In order to control the function of the AFTUSS 10, a microcontroller 64 is utilized, as shown in FIG. 1. The microcontroller 64 receives data from the differential pressure sensor 60 and then determines the amount of inert gas that must be pumped into, or released from the air-enclosing container 12. When it is necessary to pump air into the air-enclosing container, an inert gas source 66, is utilized, as shown in FIG. 3.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. An aircraft fuel tank ullage safety system adapted to function in combination with an aircraft having at least one fuel tank having a fuel tank ullage and located within the aircraft's fuselage or wings, said system comprising:
    a) at least one air-tight, flexible, resilient, air-enclosing container having a container ullage, wherein said container is dimensioned to substantially occupy the space of the fuel tank ullage,
    b) means for determining the internal pressure of the aircraft's fuel tank, and
    c) means for controlling and maintaining the volume of said air-enclosing container as determined by the internal pressure of the aircraft's fuel tank.

2. The system as specified in claim 1 wherein said air-enclosing container is made of a plastic.

3. The system as specified in claim 2 wherein said plastic is fabric reinforced.

4. The system as specified in claim 1 wherein said gas within said air-enclosing container is air.

5. The system as specified in claim 1 wherein said means for determining the internal pressure of the aircraft's fuel tank is comprised of a differential pressure sensor.

6. The system as specified in claim 1 wherein said means for controlling and maintaining the volume of said air-enclosing container is comprised of a microcontroller.

7. An aircraft fuel tank ullage safety system that is designed to function in combination with an aircraft having at least one fuel tank located within the aircraft's fuselage or wing, a plurality of wing spars, a plurality of spar stiffeners, a plurality of floor obstructions, a plurality of electrical conduits, a fuel level measuring tube, said at least one fuel tank having a fuel tank ullage and a fuel tank ullage vent, wherein said system comprises:
    a) at least one flexible, resilient, air-enclosing container having a container ullage, wherein said container substantially occupies the space of the aircraft fuel tank ullage and contacts maximum fuel surface area,
    b) a differential pressure sensor for determining the internal pressure within the aircraft's fuel tank,
    c) a microcontroller for controlling and maintaining the volume of said air-enclosing container as determined by the internal pressure of the aircraft's at least one fuel tank.

8. The system as specified in claim 7 wherein said air-enclosing container is made of a fabric-reinforced plastic and is comprised of an upper surface, a lower surface, an inner surface, and outer side walls.

9. The system as specified in claim 7 wherein said air-enclosing container further comprises an air-pump and a pressure relief valve.

10. The system as specified in claim 9 wherein said air-pump and pressure relief valve are controlled by said microcontroller.

11. The system as specified in claim 7 wherein said air-enclosing container further comprises a pressure sensor that is in communication with by said microcontroller and said differential pressure sensor.

12. The system as specified in claim 7 wherein said air-enclosing container further comprises a spar stiffener recess for allowing the air-enclosing container to be located within the aircraft's fuel tank without obstruction from any of the fuel tank's spar stiffeners.

13. The system as specified in claim 7 wherein said air-enclosing container further comprises a circular indentation that extends through the air-enclosing container's upper surface to the lower surface and allows the aircraft's fuel level measuring tube to pass therethrough.

14. The system as specified in claim 13 wherein said circular indentation further comprises a container clearance screen which maintains a distance between the aircraft's fuel level measuring tube and said container's surface.

15. The system as specified in claim 7 wherein said air-enclosing container further comprises at least one offset which allows the air-enclosing container to be located within the aircraft's fuel tank without obstruction from the aircraft's wing spars, spar stiffeners, floor obstructions or electrical conduits.

16. The system as specified in claim 7 wherein said air-enclosing container further comprises a plurality of horizontal corrugated folds that are located along the container's side walls.

17. The system as specified in claim 7 wherein said air-enclosing container further comprises a manifold connection means.

18. The system as specified in claim 17 wherein located above said air-enclosing container, and connected by the manifold connection means is a manifold.

19. The system as specified in claim 18 wherein said manifold further comprises an outer ullage vent, wherein said vent is controlled by the air pump and the pressure relief valve.

20. The system as specified in claim 7 further comprising an inert gas source for providing inert gas that is located within the aircraft's fuel tank's ullage that is minimized as a result of said air-enclosing container.

21. The system as specified in claim 20 wherein said inert gas is comprised of nitrogen or carbon dioxide.

* * * * *